BEST AVAILABLE COPY
C. C. COLE,
Assignor to S. L. BIGNALL.
Filtering Tube for Wells.
No. 9,724. Reissued May 31, 1881.
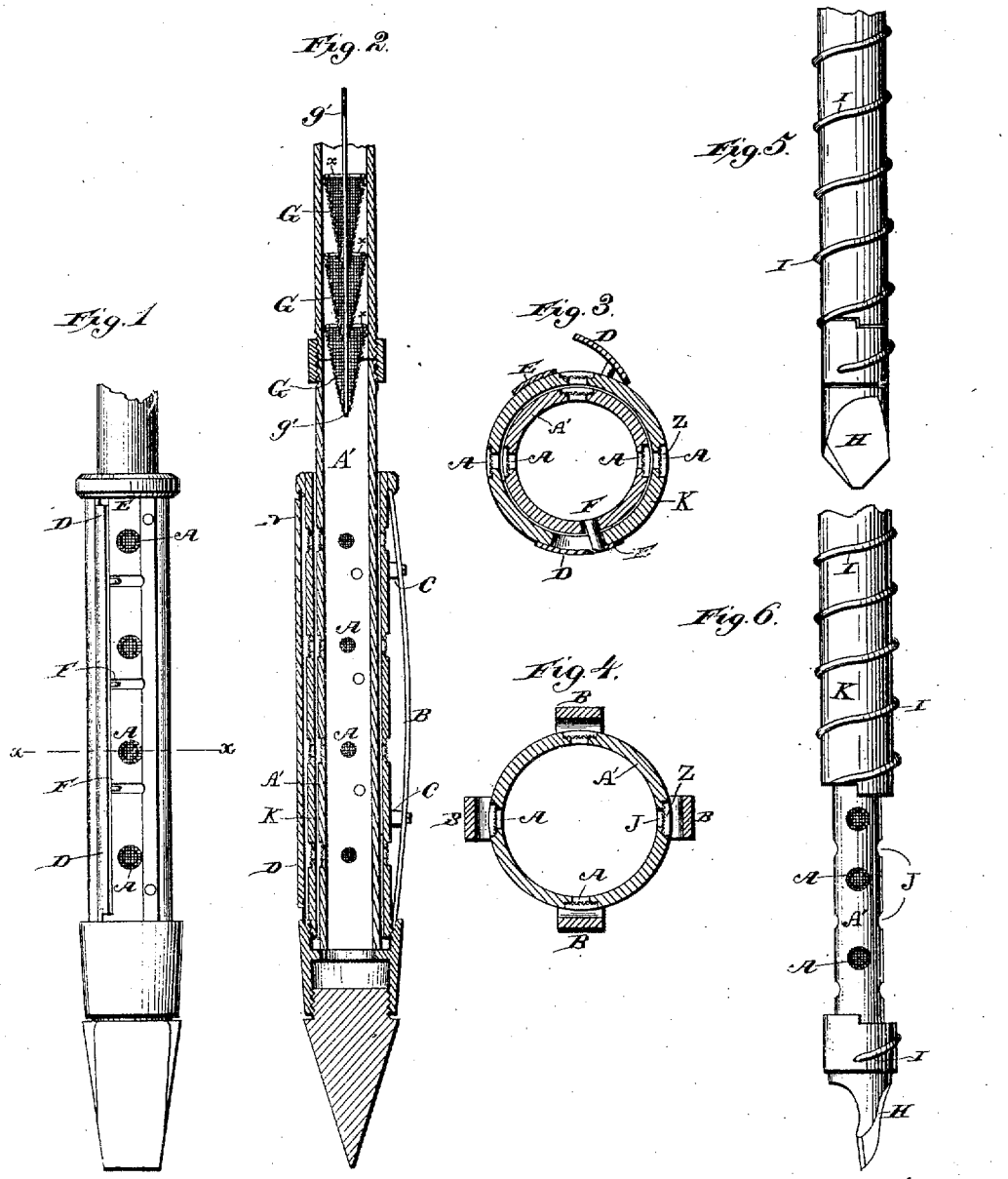
Witnesses.
Robert Everett
James A. Rutherford
Inventor.
Charles C. Cole.
By Wood & Boyd
Attys.

UNITED STATES PATENT OFFICE.

CHARLES C. COLE, OF MANCHESTER, NEW HAMPSHIRE, ASSIGNOR TO SOLOMON L. BIGNALL, OF CHICAGO, ILLINOIS; SAID BIGNALL ASSIGNOR TO L. M. RUMSEY, TRUSTEE.

FILTERING-TUBE FOR WELLS.

SPECIFICATION forming part of Reissued Letters Patent No. 9,724, dated May 31, 1881.

Original No. 61,400, dated January 22, 1867. Application for reissue filed December 22, 1873.

*To all whom it may concern:*

Be it known that I, CHARLES C. COLE, of Manchester, New Hampshire, have invented an Improvement in Filtering-Tubes for Wells, of which the following is a specification.

My invention consists, first, in a filtering well-tube provided with a driving-point, and having a series of holes pierced in the sides of the barrel of the pipe, said holes being covered with filtering-strainers; secondly, in a filtering well-tube having a driving-point, the said tube having a series of countersunk holes, in which holes are secured strainers by solder or other means; thirdly, in protecting the strainers by hinged or stationary plates; and, fourthly, in the combination of cone or cup shaped strainers with the tubing.

Figure 1 is a side view of the lower part of the well-tube, the hinged plate being turned up or opened. Fig. 2 is a vertical longitudinal central section of the same, showing two ways of protecting the countersunk strainers. Fig. 3 is a cross-section of the same, taken through line *xx*, Fig. 1, showing the countersunk strainers protected by hinged plates; Fig. 4, a cross-section of the same, showing the countersunk strainers protected by stationary plates. Fig. 5 is a side view of a modification of my invention, illustrating the manner of protecting the countersunk strainers when the tube is bored into the ground. Fig. 6 is a side view of the same, showing the countersunk strainers uncovered.

When the tubing is driven into the ground the strainers A may be covered and protected by plates B, which are secured to the sides of the tubing by screws, and kept from covering the strainers too closely by blocks C, placed between said plates and the side of the tubing, and held in place by screws that hold the said plates.

J represents holes through the main tube A′ and outer case, K, which have countersinks Z formed around them, in the outsides of the tubes, to receive wire-cloth or strainers A, at such depth below the periphery of the tubes as will prevent earth or rock from disturbing the strainers when the tube is being sunk.

The strainers are held in place by solder laid on them so as to unite with the material of the tubes, or they may be secured by any other suitable means. This arrangement is such as to obviate the necessity of covering the main tube wholly with wire-cloth, as is usually done, thereby saving material and obviating the liability of the strainers becoming detached when being put down.

The strainers A may be protected by plates D, hinged at one end to the side of the tubing, and the other edge shutting down at the side of a stationary bar, E, securely attached to the side of the tubing.

When the hinged plates D are used the lower section or sections, in which the countersunk strainers A are placed, are made double—that is to say, may consist of an exterior and interior tube, both of which are provided with countersunk strainers.

The movement of the exterior and interior tubes upon each other is regulated by stop-pins F, attached to the inner tube and working in slots formed in the outer tube, as shown in Figs. 1 and 3.

The ends of the pins F project through the outer tube, and are inclined, so that when the inner tube is revolved to bring its strainers opposite to the strainers in the outer tube the ends of said pins may raise or open the hinged plates D, so that the water may enter the tubes and be raised by the pump.

This construction may be used when the tubing is being driven into the ground, when it is bored into the ground, or when it is placed in a hole bored by a separate auger.

G are cone or cup shaped strainers, attached to a central rod, *g′*, and placed wherever desired between the sections that contain the countersunk strainers A and the pump. The upper ends of the mouths of the strainers G are kept distended by coiled-wire springs X, as shown in Fig. 2, and a loop or eye is formed upon the upper end of the rod *g′*, for convenience in removing or adjusting the strainers G, as may be required.

In Figs. 5 and 6 an auger, H, is represented as being formed upon or attached to the lower end of the interior tube, so that the tube may be made to force a passage for itself into the ground, and the exterior tube is represented as having a screw-thread, I, formed upon it, which screw-thread is continued downward to the auger by passing around a band placed upon and securely attached to the lower end of the interior tube. Upon the upper edge of this band, and upon the lower edge of the exterior tube, are formed shoulders which take hold of each other in the manner of a clutch, to force the auger into the ground.

When the tube has been forced to the required depth the outer tube is turned in the other direction, which raises the outer tube and uncovers the countersunk strainers, so that the water can flow into the tube and be raised by the pump.

What I claim, and desire to secure by Letters Patent, is—

1. A filtering well-tube provided with the driving-point, and having a series of holes pierced in the sides of the barrel of the pipe, said holes being covered with filtering-strainers A, substantially as set forth.

2. A filtering well-tube having a driving-point, the said tube having a series of countersunk holes, in which holes are secured strainers A by solder or otherwise, substantially as described.

3. The countersunk strainers A, protected by hinged or stationary plates, substantially as described.

4. The combination of the cone or cup shaped strainers G with the tubing, substantially as described.

C. C. COLE.

Witnesses:
S. N. BELL,
O. D. CHAPMAN.